United States Patent Office 3,012,487
Patented Dec. 12, 1961

3,012,487
POLYEPOXIDE COMPOSITIONS
Thomas F. Mika, Orinda, Calif., assignor to Shell Oil Company, a corporation of Delaware
No Drawing. Filed Apr. 10, 1959, Ser. No. 805,377
10 Claims. (Cl. 94—22)

This invention relates to new polyepoxide compositions. More particularly, the invention provides new compositions containing polyepoxides which are particularly useful in the coating or construction of highways and airfields.

Specifically, the invention provides new compositions which are particularly useful in the coating or construction of highways and airfields which comprise a mixture of a polyepoxide possessing more than one vic-epoxy group and pine tar, the polyepoxide making up at least 10% by weight of the mixture.

As a special embodiment, the invention provides a process for using the above-described composition as a binder for skid resistant grit layers for already constructed asphalt or cement concrete highways or airfields, or as binder for aggregate in the construction of new highways and airfields. When used as a binder for grit layers, the process comprises applying a layer of the above-described composition to the desired surface, spreading a layer of grit particles and then compacting the particles and allowing the composition to set hard. When used as a binder for aggregate in the construction of new surfaces, the above-described composition is mixed with road construction mineral aggregate, the mixture is applied to the roadbed and then compacted and allowed to set hard.

As a further special embodiment, the invention provides compositions which give coatings having greater hardness and can be obtained at a lower cost than the above-noted composition. These special compositions comprise a mixture of a polyepoxide, pine tar and a petroleum derived bituminous material, such as straight run asphalt.

There is a growing need for a cheap surface coating composition that can be applied to concrete and asphalt road surfaces and exposed metal in bridges, etc. to reduce their tendency to skid when wet. In the case of asphalt surfaces, there is also a need for coatings which would have improved resistance to solvents and other chemicals. This is particularly urgent in the case of asphalt runways for jet aircraft as the jet fuels now available readily attack asphalt surfaces. In view of the increased cost of resurfacing and rebuilding roads and runways, it would also be desirable to have a coating which would help reduce the destruction of the road and runway due to wear, rain, deicing salts and cold weather.

Various coatings have been suggested for the above purposes, but heretofore they have not proved very satisfactory. In many cases, the coatings failed to have the necessary adhesion to the grit, concrete, asphalt and metal surfaces, particularly if they were oily or dirty. In other cases, the coatings failed to stand up under inclement weather conditions. In still other cases, the coatings failed to have the necessary resistance to solvents and chemicals and failed to have the desired wear and non-skid properties. In other cases, the coatings were too difficult or expensive to apply.

It is an object of the invention, therefore, to provide new compositions of matter. It is a further object to provide new compositions of matter which are particularly useful in the preparation of non-skid surface compositions. It is a further object to provide new surfacing compositions which form non-skid coatings which are resistant to solvents, water deicing salts and acids. It is a further object to provide new road coatings which are relatively inexpensive to apply. It is a further object to provide new compositions which are useful and valuable for construction of new roadbeds and airfield strips for jet aircraft. Other objects and advantages of the invention will be apparent from the following detailed description thereof.

It has now been discovered that these and other objects may be accomplished by the compositions of the invention comprising a mixture of pine tar and a polyepoxide having more than one vicinal epoxy group, polyepoxide being present in an amount of at least 10% by weight. It has been found that these compositions when cured form homogeneous insoluble, infusible products which have excellent adhesion to the concrete and asphalt surfaces and have excellent resistance to wear, cold weather and various materials, such as solvents, deicing salts, acids and various types of jet fuels. The coatings are particularly attractive in that they may be applied to old or new roadways, runways or walkways and set up quickly without the use of any special curing conditions. The new compositions can also be mixed with aggregate and the combined mixture compacted and cured to form superior roadways and airstrips for jet aircraft.

It has been found that compositions having the above-described properties as well as outstanding hardness and homogeneity can be obtained by including in the above-noted compositions a petroleum derived bituminous material, such as straight run asphalt. This was quite unexpected in view of the fact that polyepoxides containing asphaltic materials generally gave incompatible compositions. The pine tar thus acts as an unexpected compatibilizing material and permits preparation of homogeneous products containing the polyepoxides and many bituminous materials such as straight run asphalts, industrial fuel oils and the like.

The new compositions, including those containing the petroleum derived bituminous materials, also find use in the preparation of regular surface coatings for metal, wood, plaster and the like, as well as in the preparation of laminates, castings, moldings and the like as noted hereinafter.

The polyepoxide materials to be added to the compositions of the invention comprise those organic materials having more than one vicinal epoxy group, i.e., more than one

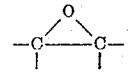

group, which may be in a terminal or internal position. The polyepoxides may be saturated or unsaturated, aliphatic, cycloaliphatic, aromatic or heterocyclic and may be substituted if desired with substituents, such as chlorine atoms, hydroxyl groups, ether radicals, and the like. They may also be monomeric or polymeric.

For clarity, many of the polyepoxides and particularly those of the polymeric type will be described throughout the specification and claims in terms of epoxy equivalent value. The meaning of this expression is described in U.S. 2,633,458.

If the polyepoxide material consists of a single compound and all of the epoxy groups are intact, the epoxy equivalency will be integers, such as 2, 3, 4 and the like. However, in the case of the polymeric type polyepoxides many of the materials may contain some of the monomeric monoepoxides or have some of their epoxy groups hydrated or otherwise reacted and/or contain macromolecules of somewhat different molecular weight so the epoxy equivalent values may be quite low and contain fractional values. The polymeric material may, for example, have epoxy equivalent values, such as 1.5, 1.8, 2.5, and the like.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linolenate, ethyl 9,12-octadecadienoate, butyl 9,12,15-octadecatrienoate, ethyl elaseostearate, octyl 9,12-octadecadienoate, methyl elaeostearate, monoglycerides of tung oil fatty acids, monoglycerides of soybean oil, sunflower, rapeseed, hempseed, sardine, cottonseed oil, and the like.

Another group comprises the diglycidyl esters of dibasic acids such as adipic, pimelic, suberic, azelaic, sebacic, maleic, phthalic, terephthalic, isophthalic and the like.

Another group of the epoxy-containing materials used in the process of the invention includes the epoxidized esters of unsaturated monohydric alcohols and polycarboxylic acids, such as, for example, di(2,3-epoxybutyl) adipate, di(2,3-epoxybutyl)oxalate, di(2,3-epoxyhexyl) succinate, di(3,4-epoxybutyl)maleate, di(2,3-epoxyoctyl) pimelate, di(2,3-epoxybutyl)phthalate, di(2,3-epoxybutyl) tetrahydrophthalate, di(4,5-epoxydodecyl)maleate, di-(2,3-epoxybutyl)tetraphthalate, di(2,3-epoxypentyl)thiodipropionate, di(5,6-epoxytetradecyl)diphenyl-dicarboxylate, di(3,4-epoxyheptyl)sulfonyldibutyrate, tri(2,3-epoxybutyl) 1,2,4-butanetricarboxylate, di(5,6-epoxypentadecyl) tetrate, di(4,5-epoxytetradecyl)maleate, di(2,3-epoxybutyl)azelate, di(3,4-epoxybutyl)citrate, di(5,6-epoxyoctyl) cyclohexane-1,3-dicarboxylate, di(4,5-epoxyoctadecyl)malonate.

Another group of the epoxy-containing materials include those epoxidized esters of unsaturated alcohols and unsaturated carboxylic acids, such as 2,3-epoxybutyl 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials include epoxidized derivatives of polyethylenically unsaturated polycarboxylic acids such as, for example, dimethyl 8,9,12,13 - diepoxyeicosanedioate, dibutyl-eicosanedioate, dihexyl 6,7,10,11-diepoxyhexadecanedioate, didecyl cyclohexane-1,2-dicarboxylate, dicyclohexyl 3,4,5,6-diepoxy-cyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprising the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting the diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene styrene copolymers and the like.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A, B, C, and D described in U.S. 2,633,458 are good examples of polyepoxides of this type. Other examples include the polyglycidyl ether of 1,1,2,2,-tetrakis-(4-hydroxyphenyl)ethane (epoxy value of 0.45 eq./100 g. and melting point 85° C.) polyglycidyl ether of 1,1,5,5-tetrakis(hydroxyphenyl)pentane (epoxy value 0.514 eq./100 g.) and the like and mixtures thereof.

The material to be used in combination with the polyepoxides is known commercially as pine tar. A description of the properties of pine tar may be found in "Asphalts and Allied Substances" by Abraham, 5th ed. and that disclosure is incorporated herein by reference, particularly pages 326 and 327. The pine tar is to be distinguished from the coal tars in solubility, the pine tars being soluble in solvents, such as methanol and ethanol, and ketones, such as acetone, while the coal tars are relatively insoluble in these solvents. The pine tar is further distinguished in being acidic and having an acid number of at least 50. The coal tars, on the other hand, are not acidic. Further, the pine tar is free of naphthalene and anthracene, which are present in coal tars. The pine tar is also to be distinguished from "vinsol" resins, which are petroleum hydrocarbon insoluble while the pine tar is soluble in petroleum hydrocarbons. Vinsol resin is also substantially neutral while pine tar is acidic as noted above.

Petroleum derived materials that may be used in combination with the pine tar include, among others, asphalts, residual fuel oils and the like. Preferred asphalts comprise straight run, blown, cracked, aromatic, and catalytically or non-catalytically polymerized asphalts. Beneficial effects are attained by the modification of all types of asphalts regardless of their original penetrations or softening points. Aromatic asphalts may be improved with respect to their flexibility by use of the present invention and thus broaden the possible uses of these products which are normally hard and brittle. A typical aromatic asphalt comprises the bottoms product from the distillation of catalytically cracked gas oil.

Straight run asphalts which are used, for example, for paving grade purposes are greatly improved by the incorporation of the polymerized products as described previously. Normally, straight run asphalts particularly suitable for paving purposes have penetrations between about 40 and about 300 and softening points within the range from about 145° F. to about 95° F. Blown asphalts, suitable for use in roofing may be improved with respect to their penetration and softening point relationships by the use of the present invention. Blown asphalts are normally produced in the presence or absence of catalysts by blowing at elevated temperatures with an oxygen-containing gas such as air. A typical asphalt may have softening point range of between about 240° F. and about 160° F. and a penetration within the range from about 30 to about 5.

Other preferred materials include high boiling extracts of petroleum, such as those obtained by extracting petroleum with solvents having preferential selectivity for aromatic. To obtain such extracts various non-reactive, highly polar, aromatically preferential solvents are used such as liquid $SO_2$, phenol, cresylic acid, furfural, beta, beta-dichloroethyl ether, nitrogenzene and the like. The use of the so-called double solvent process employing mutually immiscible solvents like cresylic acid and propane also gives suitable extracts. Especially preferred are the Edeleanu and furfural extracts of petroleum distillates, i.e., extracts obtained by use of liquid $SO_2$ or liquid $SO_2$ in combination with benzene, etc. The extracts are high-boiling materials which range in general from viscous liquids to tar-like materials at ordinary temperatures. Extracts boiling above 300° C. at 760 mm. Hg are preferred.

Another preferred group of bituminous materials include residual fuel oils, such as residual fuel oils having a viscosity between 10 cs. at 100° F. to about 1500 cs. at 100° F.

The compositions of the invention may be prepared by any suitable method. The compositions may be prepared, for example, by simply mixing the components together with or without the application of heat. If one or more of the components are very thick liquids or solids, it is generally preferred to heat them before or during the mixing. Various solvents or diluents which will evaporate before or during cure may be added to assist in the preparation of the mixture, but the addition of these materials is not generally desirable as it usually lengthens the time of cure of the finished product. Suitable solvents include hydrocarbons, such as xylene, benzene, and the like. It is also convenient in some cases to employ all liquid polyepoxides, such as normally liquid glycidyl polyethers of polyhydric alcohols, as the diluent, or to utilize monoglycidyl derivatives such as butyl glycidyl ether, allyl glycidyl ether, etc., or other reactive materials such as nitriles, as acrylonitrile, propiononitrile and the like.

The ratio of the pine tar and the polyepoxide in the composition may vary depending upon the properties desired in the resulting product. Compositions having the above-described unexpected properties, such as good compatibility, excellent adhesion and superior coating properties, are obtained when the polyepoxide makes up at least 10% and preferably 15% to 85% by weight, and the pine tar makes up 85% to 15% by weight of the mixture. When utilized as a third component, the above-described bituminous materials preferably make up from .5% to 70% of the combined mixture.

An especially preferred type of composition covered by the present invention includes those wherein inert solid particles are used either in preparation of roadways or on coatings to give the coating excellent skid resistance. The particles should be rather finely divided and preferably have a mesh size varying from 4–300. Preferred materials include sand, finely divided rocks, finely divided shells, crushed quartz, fused aluminum oxide grits, finely divided resinous particles, and the like. Particularly preferred are the minerals, and especially the siliceous materials, such as, for example, sand and ground rock. Mixtures of various types of particles may also be used.

The amount of the inert particles to be added to the composition should be at least 50% by weight of the total mixture of bituminous material and polyepoxide and should preferably be between 70% to 2000% by weight of the mixture.

The inert particles may be added to the composition before it is applied, and this is the preferred method when the composition is used as a binder, or the bituminous material-imidazoline-polyepoxide mixture may be first applied to the surface and then the inert particles placed in the coating composition as in the case of coatings. Thus, in coating highway surfaces, the bituminous material-polyepoxide mixture may be applied directly to the road surface and then the inert particles, such as sand, may then be sprinkled onto the coating before it is cured.

The particles may be heated if desired to assist in the cure. Thus, aggregate heated to temperatures ranging from about 150° F. to 400° F. is useful in speeding cure of roadbeds and coatings.

When used as coatings, the compositions of the invention may be applied to any surface, but are particualrly suitable for use as surfacing compositions for concrete, asphalt, wood, and steel. The concrete may be of any of the usual types such as may be prepared from hydraulic cements, such as Portland cement and other types of aluminous and oxy salt type cements. The asphalt surfaces may be those prepared from straight run asphalts or further refined or modified asphalts. The compositions may be applied in very thin coatings or in very thick coatings. The application to the surface can be accomplished in any suitable manner. If material is thick or contains large amounts of inert particles, the material may best be applied by use of a screed, trowel, shovel or broom. If it is of a more fluid nature, it may be applied by brushing or spraying. The coatings will generally vary in thickness from about 1/16 inch to about 1/2 inch.

The composition of the invention is cured by the action of a curing agent. For this purpose, epoxy curing agents, which may be acidic, among others, alkalies like sodium or potassium hydroxides; alkali phenoxides like sodium phenoxide; carboxylic acids or anhydrides, such as formic acid, oxalic acid or phthalic anhydride; dimer or trimer acids derived from unsaturated fatty acids, 1,20-eicosanedioic acid, and the like. Friedel-Crafts metal halides like aluminum chloride, zinc chloride, ferric chloride; salts, such as zinc fluoborate, magnesium perchlorate and zinc fluosilicate; phosphoric acid and partial esters thereof including n-butyl ortho-phosphate, diethyl ortho-phosphate and hexaethyltetraphosphate; amino compounds, such as, for example, diethylene triamine, triethylene tetramine, dicyandiamide, melamine, pyridine, cyclohexylamine, benzyldimethylamine, benzylamine, diethylaniline, triethanolamine, piperidine, tetramethylpiperazine, N,N-dibutyl-1,3-propane diamine, 2,3-diamino-2-methylbutane, 2,4-diamino-2-methylpentane, 2,4-diamino-2,6-dimethyloctane, dibutylamine, dioctylamine, dinonylamine, distearylamine, diallylamine, dicyclohexylamine, methylethylamine, ethylcyclohexylamine, o-tolylnaphthylamine, pyrrolidine, 2-methylpyrrolidine, tetrahydropyridine, 2-methylpiperidine, 2,6-dimethylpiperidine, diaminopyridine, tetramethylpentane, meta-phenylene diamine, and the like, and soluble adducts of amines and polyepoxides and their salts, such as described in U.S. 2,651,589 and U.S. 2,640,037.

Preferred curing agents are the polycarboxylic acid anhydrides, the primary and secondary aliphatic, cycloaliphatic and aromatic amines and adducts of the amines and polyepoxides.

The amount of the curing agent employed will vary depending upon the type of agent selected. In general, the amount of the curing agent will vary from about 0.5% to 200% by weight of the polyepoxide. With agents containing active hydrogen, as primary and secondary amines, acids, mercaptans and the like, it is preferred to use from about .6 to 1.5 equivalents of the said agent per equivalent of epoxy. An equivalent refers to that amount needed to furnish 1 active H per epoxy group. The tertiary amines and $BF_3$ complexes are preferably employed in amounts varying from about 0.5% to 20% and the metal salts are preferably employed in amounts varying from about 1% to 15%.

Because of acidic nature, when using amines as curing agent, it is preferred to use at least 5% more of the amines (on equivalent basis) than would ordinarily be required.

The curing agents may be added to the compositions at any time. It is generally preferred to prepare the pine tar-polyepoxide compositions and the curing agents as separate packages and then mix the two just before application to the desired surface. The curing agent may also be sprayed or otherwise applied to the coating of the pine tar polyepoxide mixture after it has been applied to the desired surface, but this procedure is less preferred. It is possible also to add the curing agent to the pine tar before combining with the polyepoxide.

To illustrate the manner in which the invention may be carried out, the following examples are given. It is to be understood, however, that the examples are for the purpose of illustration and the invention is not to be regarded as limited to any of the specific compounds or conditions recited therein. Unless otherwise specified, parts disclosed in the examples are parts by weight.

Concrete used in the examples was prepared from hydraulic cement (Portland cement) aggregate and water.

*Example I*

This example illustrates the preparation and some of the properties of a composition prepared from pine tar and polyether B.

10 parts of polyether B and 10 parts of the pine tar and two parts of diethyl amino propylamine were mixed together. This mixture was then spread out as a thin film on tin panels and the coated panels heated at 100° C. for one hour. The resulting films were very hard and tough and had good solvent resistance.

A composition was prepared as described above and spread out as a thin film on cement concrete surfaces.

100 parts by weight of sand was sprinkled on composition and compacted by rolling. This mixture was then allowed to set for 10 hours. The resulting coating was a very hard tough skid resistant coating. The coating also demonstrated excellent resistance to jet fuels.

*Example II*

This example illustrates the preparation and some of the properties of the composition prepared from pine tar and polyether D.

100 parts of polyether D was added to xylene and heated to 120° F. 100 parts of pine tar and 20 parts of diethyl amino propylamine were then added. This mixture was applied to steel panels and cured at 100° C. for one hour. The resulting coating was insoluble and was very hard and tough.

The composition was prepared as above and spread out on a cement concrete surface. Finely divided sand was then applied to the coating and compacted by rolling. The composition was then allowed to set until hard. The resulting coating was very hard and flexible and had good skid resistance.

*Example III*

This example illustrates the preparation of the coating composition comprising polyether A, pine tar and straight run asphalt.

50 parts of straight run asphalt was combined with 33 parts of polyether A and 17 parts of pine tar. Three parts of diethyl triamine was then added to the mixture and the combined mixture spread on a cement concrete surface. Sand at about 200° C. was then spread on the coating and the mixture allowed to set until hard. The resulting product was a hard tough solvent resistant coating having excellent skid resistance.

*Example IV*

This example illustrates the use of the compositions prepared in the preceding example as a binder for the preparation of the roadbed.

100 parts of the composition prepared as in the preceding example containing polyether A, pine tar and straight run asphalt was mixed with 100 parts of aggregate and the aggregate applied in a 2 inch layer in a roadbed and compacted together by the use of a roller. The resulting product was allowed to set at atmospheric temperature, that is about 60° F. After several hours, the roadbed became very hard and tough and had good resistance to jet solvents.

*Example V*

This example illustrates the preparation and some of the properties of a composition containing pine tar and a mixture of polyether A and epoxidized tetrahydrobenzyl tetrahydrobenzoate.

10 parts of pine tar was combined with 10 parts of a mixture of polyether A (50 parts) and epoxidized tetrahydrobenzyl tetrahydrobenzoate (50 parts) and two parts of diethylene triamine. This mixture was spread on cement concrete and hot sand was sprinkled on the top of the film and compacted by the use of a roller. The coating was then allowed to set hard at atmospheric temperature. The resulting product was a hard tough solvent resistant and skid resistant coating.

*Example VI*

This example illustrates the preparation and some of the properties of a composition containing polyether A, pine tar and an extract of petroleum distillate (Dutrex 22) having the following properties: Gravity °API 3.3; Flash, COC 525° F.; Viscosity SSF at 210° F. 261; and Aniline P85° F.

50 parts of polyether A was combined with 30 parts of pine tar and 20 parts of the above-described petroleum extract. Three parts of diethylene triamine was then added and the combined mixtures spread on a cement concrete surface as a thick film. Sand at about 200° C. was then applied to the coating and compacted by rolling. The combination was then allowed to cure at atmospheric temperature. In a few hours the mixture had set to form a hard solvent resistant non-skid coating.

*Example VII*

This example illustrates the preparation and properties of a mixture containing 75 parts of polyether A and 25 parts of pine tar.

75 parts of polyether A, 25 parts of pine tar and 20 parts of diethylene triamine were combined together and the mixture spread on an asphalt roadbed with the film thickness of about 1/16". Hot sand was then spread on top of the coating and the particles compacted by the use of a roller. The coating was then allowed to set hard at atmospheric temperature in a few hours film of a very hard tough solvent resistant non-skid coating.

*Example VIII*

50 parts of epoxidized linseed oil triglyceride, 25 parts of polyether A and 25 parts of pine tar were combined and 20 parts of diethylene triamine added thereto. This mixture was spread out as a thin film on an asphalt roadbed and hot sand was sprinkled on top of the coating. The mixture was then allowed to set hard at atmospheric temperatures. The resulting product was a hard tough solvent resistant non-skid coating.

*Example IX*

100 parts of polyether B and approximately chemically equivalent amount of methyl nadic and 100 parts of pine tar were mixed together and then spread out as a thin film on tin panels and the coated panels heated for several hours at 175° C. The resulting films were very hard and tough and had good solvent resistance.

A composition was prepared as described above and spread out as a thin film of about 1/16 inch thickness on a cement concrete surface. An approximately equal part by weight of sand heated to a temperature of 200° C. was sprinkled on the coating and compacted by rolling. This composition was then allowed to set hard. The resulting coating was a hard tough skid resistant coating. The coating also possessed excellent resistance to jet fuels.

*Example X*

50 parts by weight of straight run asphalt was combined with 33 parts by weight of polyether A and 17 parts by weight of pine tar. An equivalent amount of phthalic anhydride based upon polyether A was then added to the mixture and the combined mixture spread on a cement concrete surface. Sand at a temperature of about 200° C. was sprinkled on the coating and the combined mixture allowed to set hard. The resulting coating was a hard tough solvent resistant coating having excellent skid resistance.

*Example XI*

Examples VI, VII, IX and X are repeated with the exception that the polyether resin is replaced by a chemically equivalent amount of each of the following: epoxidized dicrotyl phthalate, epoxidized 2,2-bis(4-cyclohexenyl)propane, epoxidized tetrahydrobenzyl tetrahydrobenzoate and a polymer of glycidyl methacrylate and styrene having a molecular weight of about 1500. Related results are obtained in each case.

*Example XII*

Examples I, II, IV and XI are repeated with the exception that the composition is applied as a thin film on asphaltic concrete. Related results are obtained in each case.

I claim as my invention:

1. A composition comprising pine tar and a polyepoxide having more than one vicinal epoxy group.

2. A composition comprising a mixture of pine tar and a polyepoxy ether having a 1,2-epoxy equivalency greater than 1.0, the pine tar and polyepoxy ether being combined in a weight ratio varying from 5:1 to 1:5.

3. A composition comprising a mixture of pine tar, a liquid polyepoxide having more than one vicinal epoxy group and a petroleum derived bituminous material of the group consisting of asphalts, residual fuel oils and high boiling extracts of petroleum and petroleum distillates.

4. A surfacing composition comprising a mixture of pine tar, a glycidyl polyether of a polyhydric phenol having an epoxy equivalency greater than 1.0 and from 1 to 6 times the combined weight of the pine tar and glycidyl polyether of small abrasive inert particles, and 1% to 30% by weight of the glycidyl polyether of an amine curing agent.

5. A paving composition comprising a mixture of pine tar, straight run asphalt, a glycidyl polyether of 2,2-bis(4-hydroxyphenyl)propane and 1% to 30% by weight of an amine curing agent.

6. A process for treating surfaces to render them non-skid which comprises applying to the surface a composition comprising a mixture of pine tar and a polyepoxide having more than one glycidyl epoxide group, and spreading small inert particles over the coated surface and compacting.

7. A process for treating roadway surfaces to render them non-skid which comprises (1) cleaning the roadway surface, (2) applying to the surface at a temperature between 15° C. and 150° C. a composition comprising a mixture of pine tar and a liquid polyepoxide having more than one vicinal epoxy group and an epoxide curing agent, and (3) applying to the layer of a composition small inert particles, compacting and allowing the mixture to set.

8. A process for preparing a roadway comprising mixing aggregate with a mixture of pine tar and a polyepoxide having more than one vicinal epoxy group, an epoxy curing agent, spreading the mixture out, compacting and allowing to set hard.

9. A process as in claim 8 wherein the mixture of pine tar and polyepoxide also contains a petroleum derived asphalt.

10. A composition comprising 10% to 70% polyepoxide having more than one vicinal epoxy group, 70% to 5% pine tar, and 25% to 85% asphalt.

References Cited in the file of this patent

UNITED STATES PATENTS

| 2,765,288 | Whittier et al. | Oct. 2, 1956 |
| 2,844,554 | Nichols et al. | July 22, 1958 |
| 2,895,389 | Nagin | July 21, 1959 |
| 2,906,720 | Simpson | Sept. 29, 1959 |

FOREIGN PATENTS

| 802,099 | Great Britain | Oct. 1, 1958 |